(12) United States Patent
Stocq et al.

(10) Patent No.: US 6,426,120 B1
(45) Date of Patent: Jul. 30, 2002

(54) TREATMENT OF CELLULOSE SUBSTRATES

(75) Inventors: Robert Stocq, Bernissart; Laure Waegemans, Brussels, both of (BE)

(73) Assignee: Morgan Adhesives Company, Stow, OH (US)

( * ) Notice: Subject to any disclaimer, the term of this patent is extended or adjusted under 35 U.S.C. 154(b) by 0 days.

(21) Appl. No.: 09/803,353

(22) Filed: Mar. 12, 2001

Related U.S. Application Data

(63) Continuation of application No. PCT/BE00/00083, filed on Jul. 12, 2000.

(30) Foreign Application Priority Data

Jul. 12, 2000 (BE) .............................................. 09900477

(51) Int. Cl.⁷ ................................................. B05D 7/04
(52) U.S. Cl. ..................... 427/387; 427/391; 427/393.4; 428/447; 428/452
(58) Field of Search ............................ 427/391, 393.4, 427/387; 428/447, 452

(56) References Cited

U.S. PATENT DOCUMENTS

| | | | |
|---|---|---|---|
| 5,108,782 A | 4/1992 | Reed ........................... | 427/387 |
| 5,360,851 A | 11/1994 | Feder et all. ................ | 524/157 |
| 5,721,026 A | 2/1998 | Feder et al. ................ | 428/35.4 |
| 5,767,206 A * | 6/1998 | Ariagno et al. ............. | 525/479 |

FOREIGN PATENT DOCUMENTS

EP 0 410 899 1/1991
JP 09-217296 A2 * 8/1997

OTHER PUBLICATIONS

Chadov et al, Sb. Tr. TsNIIB, Khimiya Bumagi (Orekhov, B, V., ed), 1998, pp. 138–142.*
Database WPI, Section Ch Week 199743, Derwent Publications ltd., London, GB; AN 1997–466514 XP002136529 & JP 09 217296 A (Toa Gosei Chem Ind Ltd ), Aug. 19, 1997, abstract (See also ISR).
Database WPI, Section Ch. Week 199743, Derwent Publications ltd., London, GB;AN 1997–466514 XP002136529 & JP 09 217296 A (Toa Gosei Chem Ind Ltd ), Aug. 19, 1997, abstract (See also ISR).

* cited by examiner

*Primary Examiner*—Erma Cameron
(74) *Attorney, Agent, or Firm*—Pillsbury Winthrop LLP

(57) ABSTRACT

The invention concerns a method for treating a cellulosic support to reduce the penetration of anti-adhesive agent into the support and/or to diminish its sensitivity to water. Said method consists in contacting the cellulosic support with an aqueous emulsion based on a grafted functionalised polyorganosiloxane, wherein said emulsion further contains an acrylic-type polymeric material, said polymeric material advantageously containing a styrene fraction.

23 Claims, 3 Drawing Sheets

Figure 1:
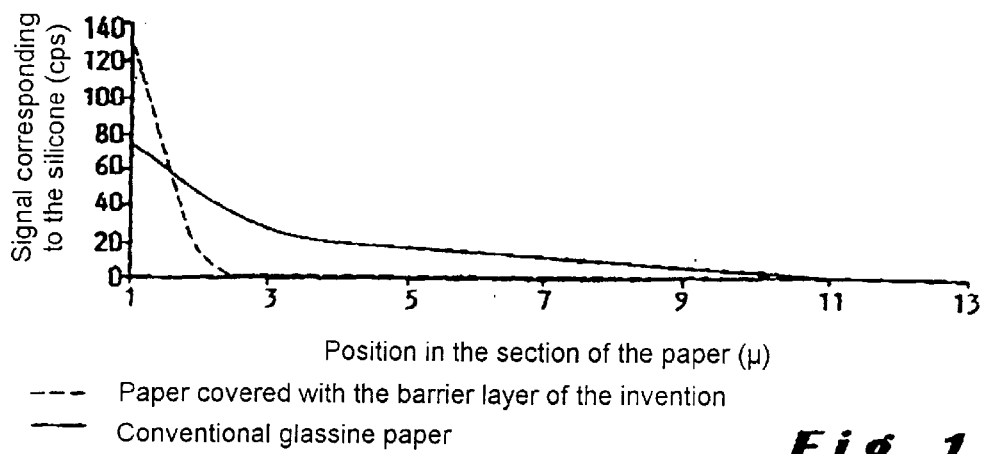

Profile for penetration of the silicone of the paper

--- Paper covered with the barrier layer of the invention
— Conventional glassine paper Water absorption profile of three papers, 2 of which are coated Silicone absorption profile of three papers, 2 of which are coated Thermogravimetric method: Evaluation of the permeability to water vapour (evaporation of water through the paper at 60°C)

TREATMENT OF CELLULOSE SUBSTRATES

REFERENCE TO PRIOR APPLICATIONS

This is a Continuation of: International Appln. No. PCT/BE00/00083 filed Jul. 12, 2000 which designated the U.S., and that International Application was not published under PCT Article 21(2) in English, and also claims the priority of Belgium Application No. 9900477 filed Jul. 12, 1999, the contents of both being incorporated hereinto by this reference.

The present invention relates to a process for the treatment of cellulose substrates which makes it possible to reduce the penetration of adhesive-resistant agents into the substrates and/or to decrease their sensitivity to water, by bringing these cellulose substrates into contact with aqueous emulsions based on grafted functionalized polyorganosiloxane, and to the use of said aqueous emulsions as adhesive-resistant and/or water-repellent coating on cellulose substrates in the manufacture of pressure-sensitive adhesives.

Self-adhering products or pressure-sensitive adhesives generally comprise a frontal material composed of a paper or of a polymer film, such as of PVC, PBE, PP or PET, this part of the product generally being printed and acting as label, which will subsequently be adhesively bonded to the article to be identified. The adhesive bonding of the label is carried out on the article by simply pressing a layer of pressure-sensitive adhesive applied to the back of the label. Protection of the adhesive or sticky layer of the self-adhesive label, at the time when the latter is applied to the product concerned, is provided by a protective paper or polymer film to which has been applied a fine silicone layer, usually in the form of a deposit of 1 to 2 $g/m^2$. The silicone layer which is brought into contact with the adhesive layer makes it possible to easily remove the protective paper or film at the time of use of the self-adhering label. The force which will have to be exerted to separate the two constituents is known as the release force. This force must be controlled for the majority of label applications, in which the labels are applied automatically, and must remain stable over time.

A large proportion of self-adhesive complexes are available in the form of rolls and use, as protective film or paper, a paper of the glassine type with a density of 60–65 $g/m^2$. It is a paper manufactured from a highly beaten bisulfite pulp. The exhaustive beating makes possible significant entangling of the fibers and contributes to "closing up" the paper. To further reduce the penetration of the silicone which will subsequently be deposited on the surface of the glassine paper, a solution of carboxymethylcellulose/polyvinyl alcohol (CMC/PVA) is applied to both faces of the paper with the size press of the papermaking machine. The paper is subsequently calendered off the machine. This final operation puts the finishing touches to the "closing up" of the paper and confers a degree of transparency on the latter. This transparency is necessary when photoelectric cells are used to provide for automatic control of the positioning or of the progression of the paper web on various machines, such as printing machines or applicator machines.

Other protective papers are used in the field of self-adhesive products and in particular papers coated with kaolin. The inorganic coating makes possible good surface maintenance of the silicone deposited (which is not the case for a paper of the glassine type) but does not exhibit the advantage of the transparency of glassine. The protective paper of the type coated with kaolin will thus, in the majority of cases, be used in the form of sheets in applications of a more manual nature.

However, standard glassine paper coated with carboxymethylcellulose/polyvinyl alcohol exhibits certain disadvantages, including:

a large amount of silicone has to be deposited on its surface to provide the desired release force with respect to a given adhesive layer. This is because a preliminary study of the profile of penetration of a silicone through a paper carried out by analyzing the section of the paper using a scanning electron microscope coupled to an X-ray dispersive energy analyzer made it possible to establish that approximately 60% of the silicone applied to a glassine paper is found in the body of the paper (depth of penetration of up to 11 microns) and thus only the remaining 40% are of use in providing the desired release value.

the standard CMC/PVA coating leads, under certain conditions (hydrometric or abrasive conditions), to fluffing on the machine.

very poor dimensional stability. In fact, because of its highly beaten and strongly calendered nature, glassine paper varies dimensionally in a very significant fashion with hygrometric variations in the surroundings in which it is moved and thus develops very significant curl when it is complexed in the form of a self-adhesive product with a frontal product generally exhibiting better dimensional stability toward moisture. The protective frontal components in fact form a kind of "double strip" which reacts differentially toward variations in humidity. In fact, the curl often prevents the adhesive product from being satisfactorily used, for example when it is passed through photocopiers, laser printers or ink jet printers. Furthermore, if a standard glassine directly receives water on its surface, it instantaneously develops a curl such that the sheet of paper will roll up on itself.

In view of the abovementioned disadvantages, it is consequently difficult to conceive of using this type of cellulose substrate for silicone treatment in an aqueous base if the silicone coating machines are not entirely suitable for this type of silicone treatment, such as insufficient web tension, thermal ovens with a flat outline and with hot air being blown into the ovens, which are not of the flotation type.

It should also be noted that Abstract XP-002136528 (corresponding to Patent Application JP 06 248244A) is completely different from the subject matter of the present invention in that it relates to the preparation of a release paper of the Kraft type pretreated with silicone which does not exhibit specific optical properties and thus does not relate to the treatment of a cellulose substrate of the glassine type which has not been pretreated with silicone. Furthermore, the viscosity modifier added to the emulsion, which emulsion is used for this purpose, acts solely as thickener.

One of the aims of the present invention consequently consists in overcoming the abovementioned disadvantages and in providing a process for the treatment of a cellulose substrate and in particular of a paper of the glassine type which makes it possible to reduce the penetration of adhesive-resistant agent or agents into the substrate and/or to decrease its sensitivity to water by bringing the cellulose substrate into contact with an aqueous emulsion based on a grafted functionalized polyorganosiloxane.

To this end, according to the present invention, the aqueous emulsion based on a grafted functionalized polyorganosiloxane furthermore comprises a polymeric material of the acrylic type.

The polymeric material of the acrylic type advantageously originates from an acrylic monomer chosen from the group consisting of acrylic acid, methacrylic acid, acrylamide, methacrylamide, methyl acrylate and methacrylate, ethyl acrylate and methacrylate, propyl acrylate and methacrylate, butyl acrylate and methacrylate, hexyl acrylate and methacrylate, cyclohexyl acrylate and methacrylate, benzyl acrylate and methacrylate, isopropyl acrylate and methacrylate, octyl acrylate and methacrylate, methyl α-chloroacrylate, ethyl α-ethoxyacrylate, 2-ethylhexyl acrylate and methacrylate, phenyl acrylate and methacrylate, α-chloroacrylonitrile, N,N-dimethylacrylamide, N,N-dibenzylacrylamide, hydroxyethyl acrylates and methacrylates, and mixtures of at least two of these acrylic monomers.

According to an advantageous embodiment of the invention, the polymeric material of the acrylic type comprises a styrene fraction and is an acrylic/styrene copolymer.

According to an advantageous embodiment of the invention, the acrylic/styrene copolymer is chosen from the group consisting of copolymers of acrylic or methacrylic acid and of styrene, copolymers of butyl acrylate or methacrylate and of styrene and copolymers of methyl acrylate or methacrylate, of acrylonitrile or methacrylonitrile, of styrene and of 2-ethylhexyl acrylate or methacrylate.

The invention also relates to the aqueous emulsion of polyorganosiloxane and of acrylic polymeric material mentioned above as adhesive-resistant and/or water-repellent coating on a cellulose substrate, in particular glassine paper, in the manufacture of pressure-sensitive adhesives.

Other details and distinctive features of the invention will emerge from the description given below as nonlimiting example of several specific embodiments of the invention.

As has already been indicated above, the cellulose substrate is treated by applying to it, on one face or on both faces, a layer of aqueous emulsion based on a grafted functionalized polyorganosiloxane and on a polymeric material of the acrylic type. In fact, the expression "polymeric material of the acrylic type" is understood to mean any polymer or copolymer material comprising acrylic. For this, use will be made of the polymeric materials obtained by polymerizing an acrylic monomer and more particularly acrylic acid, methacrylic acid, acrylamide, methacrylamide, methyl acrylate or methacrylate, ethyl acrylate or methacrylate, propyl acrylate or methacrylate, butyl acrylate or methacrylate, hexyl acrylate or methacrylate, cyclohexyl acrylate or methacrylate, benzyl acrylate or methacrylate, isopropyl acrylate or methacrylate, octyl acrylate or methacrylate, methyl α-chloroacrylate, ethyl α-ethoxyacrylate, 2-ethylhexyl acrylate or methacrylate, phenyl acrylate or methacrylate, α-chloroacrylonitrile, N,N-dimethylacrylamide, N,N-dibenzylacrylamide, hydroxy-ethyl and butyl acrylates and methacrylates, and mixtures of at least two of these acrylic monomers. The polymeric material of the acrylic type will advantageously also comprise a styrene fraction. The expression "styrene fraction" is understood to mean any monomer comprising styrene which can copolymerize with the acrylic fraction to produce an acrylic/styrene copolymer. In this respect, styrene, α-methylstyrene, methylstyrene, 2,4-dimethylstyrene, ethylstyrene, isopropylstyrene, butylstyrene, phenylstyrene, cyclohexylstyrene, benzylstyrene, chlorostyrene, 2,5-dichlorostyrene, bromostyrene, cyanostyrene, nitrostyrene, N,N-dimethylaminostyrene, acetoxystyrene, phenoxystyrene and mixtures of at least two of these styrene monomers are particularly well suited as styrene monomer. Acrylic/styrene copolymers which are particularly well suited are copolymers of (meth)acrylic acid and of styrene, copolymers of butyl meth(acrylate) and of styrene and copolymers of methyl meth(acrylate), of meth(acrylonitrile), of styrene and of 2-ethylhexyl meth(acrylate), the expressions "(meth)acrylic", "meth(acrylate)" and "meth(acrylonitrile)" covering both acrylic and methacrylic materials.

As regards the grafted functionalized polyorganosiloxane component of the aqueous emulsion, reference will be made more particularly to Patent Application EP-0 731 137, which discloses in detail the formulation and preparation of this family of products. As will be noted, these grafted functionalized polyorganosiloxanes (POSs) are in fact composed of grafted copolymer units originating from at least one ethylenically unsaturated monomer (a) which can polymerize by the radical route and of a functionalized polyorganosiloxane comprising alike or different units of the following formula:

in which the various symbols R, X, Y and a, b and c are defined as follows:

R is C1—C18 alkyl, C2–C20 alkenyl or C6–C12 aryl, optionally substituted with halogen;

X is a reactive function linked to Si by Si—C or Si—C—O bond;

Y is ethylenically unsaturated hydrocarbon group, optionally containing O or N heteroatom, linked to Si by Si—C bond and capable to react radically with the unsaturated monomer (a); a, b and c are 0 to 3 and a+b+c=3; the content of $SiO_{4/2}$ is less than 30%. Preferably, the units (I) containing X and/or Y are present in the amount such that the functionalized polyorganosiloxane comprises at least 1 milliequivalent, preferably 5 to 500 milliequivalents, most preferably 5 to 100 milliequivalents of X, and at least 1 milliequivalent, preferably 5 to 500 milliequivalents, most preferably 5 to 100 milliequivalents of Y per 100 grams of the functionalized polyorganosiloxane. Preferred reactive function X is a C1–C20 hydrocarbon epoxy-functional group.

Figure 2:
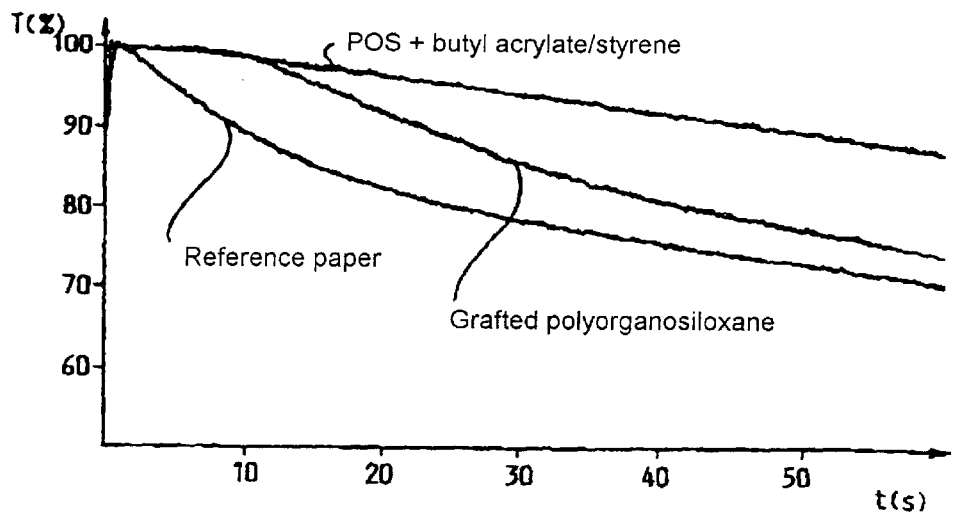
Figure 3:
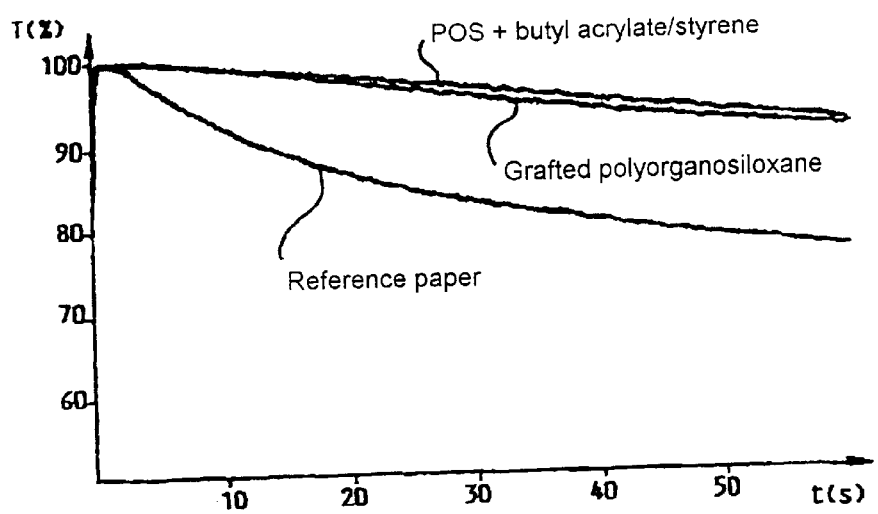
Figure 4:
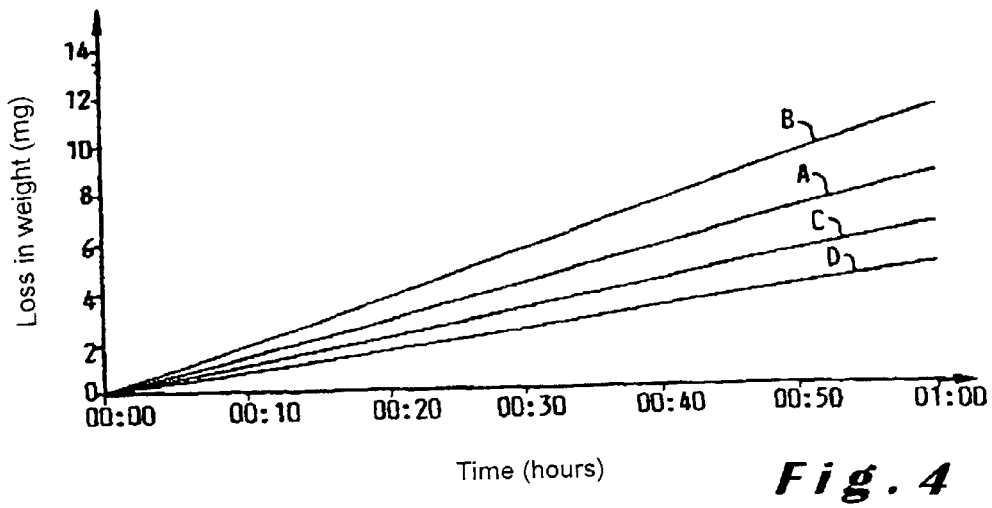

According to the present invention, the amounts by weight of polymeric material of the acrylic type and of grafted functionalized polyorganosiloxane in the aqueous emulsion vary respectively between 5 and 20%, preferably from to 20%, and between 10 and 20%, preferably of the order of 15%. As regards the respective amounts of ethylenically unsaturated monomer and of grafted functionalized polyorganosiloxane, these amounts correspond to the ratios by weight specified in Patent Application EP-0 731 737 and are 98–50/2–50 and preferably 95–75/5–25. The aqueous emulsion is in fact obtained by simple mixing of the two polymers in the form of an aqueous emulsion. In this respect, the sizes of the particles of the emulsions used in the mixture are extremely important. They range from a mean particle size of 0.3 to 1.0 μm and advantageously of 0.6 μm for the functionalized polyorganosiloxane and of 0.05 to 0.3 μm, advantageously of 0.15 μm, for the acrylic polymeric material. In fact, this very marked difference in size makes it possible to achieve better filling of the free spaces during spreading of the aqueous emulsion over the cellulose substrate, the small particles occupying the spaces created between the large particles. This configuration promotes the formation of a homogeneous and closed film at the surface of the cellulose substrate during the drying of the emulsion after coating and consequently makes it possible to decrease the penetration into the paper of the silicone which will subsequently be deposited and the absorption of water by the cellulose on the side of the coating thus applied. This advantage is demonstrated in particular by the appended FIGS. 2 and 3, which give the water absorption profile and the silicone absorption profile at 25° C. of two coated papers and of a noncoated reference paper, which show that the barrier to water and to a lesser extent to silicone is conferred in particular by the copolymer of butyl acrylate and of styrene which has been added to the polyorganosiloxane. It should also be noted in this respect that the acrylic copolymer emulsion is selected for its pH, compatible with that of the grafted functionalized POS. FIG. 4 is a graph showing the determination by thermogravimetry of the permeability to water vapor of various papers, namely of a conventional calendered paper with a CMC/PVA coating (A), of a base paper before the barrier-forming layer has been applied (B), of a base paper with a barrier layer based on a solution of grafted functionalized POS and of butyl acrylate/styrene copolymer of the invention (C) and of a base paper with a barrier layer based on a solution of the invention and a silicone layer (D).

The thermogravimetric method used consists in depositing, in a glass crucible, a predetermined amount of water and in covering this crucible using the paper, the permeability of which is desired to evaluate. As the contact surface between the water vapor and the paper is always identical (equal area) for all the samples studied, the loss in weight as a function of time is plotted at a constant preset temperature (60° C.). It is observed, from the four curves on the graph, that the paper with the barrier layer of butyl acrylate/styrene copolymer of the invention is more effective in slowing down the transmission of the water vapor in comparison with the other papers and in particular with the paper coated with a conventional CMC/PVA barrier layer. The permeabilities of the various papers were calculated by using the following formula:

$$P = \frac{\Delta W \times e}{A \times P_{VAP} \times t \times MM}$$

where

P=permeability $(mol.m^{-1}.s^{-1}.Pa^{-1})$
ΔW=loss in weight
e=thickness
A=area of the contact surface
$P_{VAP}$=vapor pressure of water at 60° C.
t=time for bringing into contact
MM=molar mass of water.

|  | ΔW mg | e μm | A m$^2$ | $P_{VAP}$ Pa | t (s) | MM (g/mol) |  | P |
|---|---|---|---|---|---|---|---|---|
| Conventional calendered paper with CMC/PVA (A) | 8.5408 | 62 | 28.27 × 10$^{-6}$ | 19915.7 | 3600 | 18 | $P_1$ | 1.4514E-11 |
| Base paper, without coating (B) | 11.2329 | 58 | 28.27 × 10$^{-5}$ | 19915.7 | 3600 | 18 | $P_2$ | 1.7858E-11 |
| Paper + grafted functionalized POS + butyl acrylate/styrene copolymer (=invention) (C) | 6.4666 | 60 | 28.27 × 10$^{-6}$ | 19915.7 | 3600 | 18 | $P_3$ | 1.0635E-11 |
| Paper + invention + silicone (D) | 4.8383 | 61 | 28.27 × 10$^{-6}$ | 19915.7 | 3600 | 18 | $P_4$ | 8.0896E-12 |

$1/P=\phi_1/P_1+\phi_2/P_2$ where

φ is the fraction by volume of the barrier layer n $1/P_3=(58/60)/P_2+(2/60)/P_{invention}$ ⇔$P_{invention}=(30(1/P_3-0.97/P_2))^{-1}$ ⇔$P_{invention}=8.3989E-13$ $mol.m^{-1}.s^{-1}.Pa^{-1}$ $1/P_4=(58/61)/P_2+(2/61)/P_{invention}+(1/61)/P_{invention+silicone}$ ⇔$P_{invention+silicone}=(61\ (1/P_4-(58/61)/P_2-(2/61)/P_{invention}))^{-1}$ ⇔$P_{invention+silicone}=5.2358E-13$ $mol.m^{-1}.s^{-1}.Pa^{31\ 1}$ It should also be noted that the glass transition temperature of the copolymer of butyl acrylate and of styrene used in combination with the POS is 20% higher than that of the grafted functionalized polyorganosiloxane polymer used alone.

$T_g$: butyl acrylate/styrene+POS: 38° C.

$T_g$: grafted functionalized polyorganosiloxane: 18.5° C.

Figure 5:
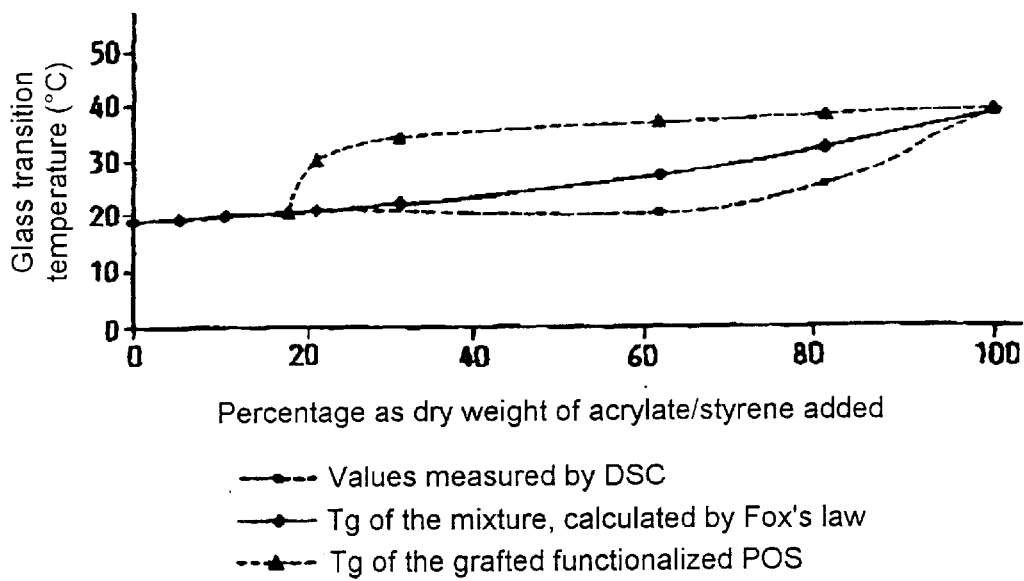

This difference in glass transition temperature is also extremely advantageous in the sense that it contributes, to the mixture of the invention, a markedly less sticky nature of the dry coating deposited at the surface of the paper than during the use of the POS alone. This property is very important with respect to paper rolls as it makes it possible to prevent the turns of paper from sticking under the effect of the reeling tension and in particular with respect to the calendering of freshly coated paper on the papermaking machine. This is because the coated paper is subsequently calendered on a supercalender off the machine under high pressure and at high temperature and it is essential to prevent any sticking of the paper in the calender if breaking of the paper is to be avoided, which breaking will thus result in a loss of time, extensive cleaning and a considerable financial loss. The graph in FIG. 5 shows in this respect the change in the glass transition temperature of a layer of polyorganosiloxane polymer as a function of the percentage of butyl acrylate/styrene copolymer added, the $T_g$ of the mixture being calculated by Fox's law.

As in the case of conventional coatings on a cellulose substrate, the aqueous emulsion of grafted functionalized polyorganosiloxane and of acrylic polymeric material can comprise one or more additives such as thickeners, antifoaming agents and/or waxes. Thus it is that, in the case of an application with a size press, a thickener will be added with the aim of obtaining a viscosity similar to that of a conventional surface treatment of glassine paper, namely CMC/PVA. The addition of a wax may prove to be necessary if the manufacture of the paper coated with the barrier layer is followed by a calendering operation of the machine. Taking into account the coating conditions, such as the temperature, the shear forces or the turbulence, the use of an antifoaming agent may also prove to be useful. In this respect, mention will more particularly be made, as thickener, of an aqueous dispersion of poly(ammonium acrylate) and, as antifoaming agent, of a modified polyalkoxylated alkyl ether in a paraffinic medium. The total amount by weight of the additive or additives in the emulsion according to the invention is generally of the order of 0.3 to 1.5%.

The following few examples serve to better illustrate the invention but do not constitute under any circumstances a limitation of the latter.

EXAMPLE 1

| Coating on a metering size press of a glassine Formulation | | |
|---|---|---|
| | % of solids content | Wet part |
| Grafted functionalized polyorganosiloxane (Silcolease 700 ® from Rhône-Poulenc) | 40 | 69.1 |
| Methyl methacrylate/ acrylonitrile/styrene/ 2-ethylhexyl acrylate copolymer (Primal HG 44 E ® from Rohm & Haas) | 41 | 13.8 |
| Zirconium carbonate crosslinking agent (Bacote 20 ® from MEL Chemicals) | 20 | 4.2 |
| Deionized water | | 12.9 |
| Antifoaming agent: polyalkoxylated alkyl ether in a paraffinic medium (Foamaster TPE 714 ® from Henkel) | | $10^{-2}$ | solids content: 34%
viscosity: 50 mPa · s at 40° C.

Procedure 4837 kg of grafted functionalized polyorganosiloxane are run with stirring (multi-bladed stirrer; 150 revolutions/min) into a stainless steel reactor with a volume of 7 m³ which has been brought to 50° C. 966 kg of the acrylic copolymer, 294 kg of Bacote 20 and 903 kg of deionized water respectively are subsequently added. 700 g of antifoaming agent are subsequently added thereto. The reactor continuously feeds the metering size press and a return tank which receives the coating surplus material (return material from the size press) to allow the level therein to be kept constant. A pump also makes it possible to feed the metering press from the tank.

| Results | |
|---|---|
| Dry deposit | (2.5 ± 0.5) g/m² on the surface to be treated with silicone |
| Scan porosity before calendering of the machine | <30 cm³/s.m² (ISO 5636/1 method) |
| Scan porosity after calendering of the machine | 0 cm³/s.m² (ISO 5636/1 method) |

This paper exhibits the following advantages:
a) All the characteristics of a conventional glassine are retained (see Table I).

TABLE I

| Characteristics | Methods and units | | Conventional glassine | Glassine of the invention |
|---|---|---|---|---|
| Grammage | ISO 536 | g/m² | 62 | 62.5 |
| Thickness | ISO 534 | μ | 53 | 55.3 |
| Transparency | DIN 53147 Elrepho 2000 | % | min 45% | 45–48% |
| Tensile strength | ISO 1924/1 | N/15 mm | | |
| machine direction | | | >73 | 84.8 |
| transverse direction | | | >37 | 41.5 |
| Tear strength | ISO 1974 | g | | |
| machine direction | | | min 34 g | 41.4 |
| transverse direction | Elmendorf device | | min 34 g | 47 |
| Bekk smoothness | ISO 5627 | s | min 850 | 937 | b) On comparing two samples coated with the same amount of silicone without solvent (Rhodorsil® from Rhône-Poulenc), the penetration of the silicone within the paper treated according to the invention is greatly reduced with respect to that within the standard glassine.

This is because it is noticed that, in a conventional glassine, the silicone penetrates into the body of the paper to a depth of 11 microns, whereas, for the glassine treated according to the invention, the penetration is halted at 3 microns. The difference in penetration in these two profiles corresponds to substantial saving in the amount of silicone at the surface of the new paper (see FIG. 1 in the appended drawings).

c) The advantage described in b) has the result that it is possible to greatly reduce the deposition of silicone during the manufacture of pressure-sensitive adhesive complexes while maintaining a weak release force which is stable over time.

Coatings Conditions for the Manufacture of Pressure-sensitive Adhesives (PSA)
  silicone treatment on a Rotomec pilot-scale coating machine with several deposits,
  deposition of an acrylic adhesive emulsion of 2-ethylhexyl acrylate type at 20 g/m² on a BMB industrial reverse gravure machine, low speed release force values (FINAT method No. 3), high speed release force values (FINAT method No. 4), change over time of the release values 1 day and 1 month after coating.

TABLE II

FTM3 release values (N/25 mm)

| Silicone deposition | Standard glassine | | Glassine treated according to the invention | |
|---|---|---|---|---|
| g/m² | 1 day | 1 month | 1 day | 1 month |
| 0.3 | 0.35 | 0.26 | 0.20 | 0.20 |
| 0.5 | 0.14 | 0.18 | 0.12 | 0.12 |
| 0.6 | 0.125 | 0.15 | 0.09 | 0.09 |
| 0.8 | 0.10 | 0.09 | 0.09 | 0.07 |
| 0.9 | 0.09 | 0.08 | — | — |
| 1.3 | 0.08 | 0.075 | — | — |

TABLE III

FTM4 release values (N/25 mm)

| Silicone deposition | Standard glassine | | Glassine treated according to the invention | |
|---|---|---|---|---|
| g/m² | 1 day | 1 month | 1 day | 1 month |
| 0.5 | 0.29 | 0.36 | 0.29 | 0.31 |
| 0.6 | 0.27 | 0.33 | 0.23 | 0.23 |
| 0.8 | 0.24 | 0.25 | 0.20 | 0.21 |
| 0.9 | 0.23 | 0.23 | 0.16 | 0.16 |
| 1.3 | 0.12 | 0.14 | — | — |

In the context of this first test, it is shown that the silicone consumption can be already reduced by 33% (0.23 N/25 mm for 0.6 g/m² with the glassine of the invention against 0.9 g/m² with the standard).

d) The behavior toward water of the new glassine of the invention is greatly improved.

| 60 second Cobb value with water (AFNOR Q03.018 method) | |
|---|---|
| Conventional glassine | 25 g/m² |
| Glassine of the invention | 2.0 g/m² |

This characteristic confers, on the paper, better suitability for silicone treatment under emulsion conditions. Furthermore, when 10 ml of water are applied using a Meyer rod over the surface of the two glassines, the standard glassine shows extremely high curl with respect to the glassine of the invention.

EXAMPLE 2

| Direct gravure with 3 rolls of a glassine Formulation | | |
|---|---|---|
| | % of solids content | Wet part |
| Grafted functionalized polyorganosiloxane (Silcolease 700 ® from Rhône Poulenc) | | |
| Methyl methacrylate/ acrylonitrile/styrene/ 2-ethylhexyl acrylate copolymer (Primal HG 44 E ® from Rohm & Haas) | 41 | 16.34 |
| Calendering wax (Permanol PAD 96 1002 ® from Dick Peters BV) | 30 | 1.80 |
| Antifoaming agent: polyalkoxylated alkyl ether in a paraffinic medium (Foamaster TPE 714 ® from Henkel) | | 0.06 | solids content: 40%
viscosity: DIN cup at 23° C.: 19 s.

This formulation, obtained according to the procedure of Example 1, is applied to a paper and calendered off the machine.

| | Results |
|---|---|
| Dry deposit | (2.5 ± 0.5) g/m² on the surface to be treated with silicone |
| Scan porosity | 0 cm³/s.m² (ISO 5636/1 method) |

This paper exhibits the following advantages:

a) All the characteristics of a conventional glassine are retained (see Table IV).

TABLE IV

| Characteristics | Methods and units | | Conventional glassine | Glassine of the invention |
|---|---|---|---|---|
| Grammage | ISO 536 | g/m² | 62 | 60 |
| Thickness | ISO 534 | μ | 53 | 52 |
| Transparency | DIN 53147 Elrepho 2000 | % | min 44% | 51.24 |
| Tensile strength machine direction | ISO 1924/1 | N/15 mm | >73 | 76 |
| transverse direction | | | >37 | 44 |
| Tear strength machine direction | ISO 1974 Elmendorf device | g | min 34 g | 44 |
| transverse direction | | | min 34 g | 50 |
| Bekk smoothness | ISO 5627 | s | min 850 | 718 | b) In the same way as for Example 1, a greatly reduced penetration of the silicone into the paper according to the invention is obtained. This observation also applies to other types of silicones, namely aqueous silicone, solvent-based silicone, or silicone which can be crosslinked by UV radiation or an electron beam.

c) The advantage described in b) has the result that it is also possible, as in Example 1, to greatly reduce the deposition of silicone during the manufacture of pressure-sensitive adhesive complexes while maintaining a weak release force which is stable over time.

Coatings Conditions for the Manufacture of Pressure-sensitive Adhesives (PSA)

- silicone treatment on a Rotomec pilot-scale coating machine with several deposits,
- deposition of an acrylic adhesive emulsion of 2-ethylhexyl acrylate type at 20 g/m² on a BMB industrial reverse gravure machine,
- low speed release force values (FINAT method No. 3),
- high speed release force values (FINAT method No. 4),
- change over time of the release values 1 day and 1 month after coating.

TABLE V

FTM3 release values (N/25 mm)

| Silicone deposition | Standard glassine | | Glassine treated according to the invention | |
|---|---|---|---|---|
| g/m² | 1 day | 1 month | 1 day | 1 month |
| 0.3 | 0.35 | 0.26 | 0.12 | 0.13 |
| 0.5 | 0.14 | 0.18 | 0.07 | 0.08 |
| 0.6 | 0.125 | 0.15 | 0.07 | 0.07 |
| 0.8 | 0.10 | 0.09 | 0.07 | 0.06 |
| 0.9 | 0.09 | 0.08 | 0.07 | 0.06 |
| 1.3 | 0.08 | 0.075 | 0.065 | 0.06 |

TABLE VI

FTM4 release values (N/25 mm)

| Silicone deposition | Standard glassine | | Glassine treated according to the invention | |
|---|---|---|---|---|
| g/m² | 1 day | 1 month | 1 day | 1 month |
| 0.3 | 0.57 | 0.78 | 0.27 | 0.31 |
| 0.5 | 0.29 | 0.36 | 0.18 | 0.16 |
| 0.6 | 0.27 | 0.33 | 0.16 | 0.17 |
| 0.8 | 0.24 | 0.25 | 0.14 | 0.14 |
| 0.9 | 0.23 | 0.23 | 0.13 | 0.13 |
| 1.3 | 0.12 | 0.14 | 0.12 | 0.12 |

Under industrial conditions, to obtain a stable release force value of 0.07 N/25 mm on a standard glassine, it is necessary to deposit of the order of 1.3 g/m² of silicone. By virtue of the paper of the present invention, the silicone deposition can be reduced to 0.5 g/m², i.e. a net saving in silicone consumption of more than 60%.

d) Behavior toward water

| 60 second Cobb value with water (AFNOR Q03.018 method) | |
|---|---|
| Conventional glassine | 25 g/m² |
| Glassine of the example | 2.4 g/m² | e) Another advantage of the present invention is the glossier appearance of the silicone when the latter is deposited on the new barrier layer (see Table VII). In fact, during the production of self-adhesive complexes, the gloss of the silicone is transferred onto the adhesive layer, which contributes a better performance thereto.

TABLE VII

| | | Conventional glassine + 1 g/m² of aqueous-based silicone | Glassine of the invention + 1 g/m² of aqueous-based silicone |
|---|---|---|---|
| Gloss, % | | | |
| (DIN 67.530 method, Dr Lange device, reflectometric measuring head) | 20° | 4 | 15 |
| | 60° | 25 | 58 |
| | 85° | 46 | 75 |

EXAMPLE 3

Conversion by Coating on Direct Gravure with 3 Rolls of a Frontal Paper of the Writing Type to Paper for Silicone Treatment The barrier layer of the present invention is applied to an 80 g/m² uncoated writing paper in accordance with the procedure of Example 2.

| Formulation | | |
|---|---|---|
| | % of solids content | Wet part |
| Grafted functionalized polyorganosiloxane (Silcolease 700 ® from Rhône-Poulenc) | 40 | 82 |
| Butyl acrylate/styrene copolymer (Primal EP 4030 ® from Rohm & Haas) | 50 | 18 | solids content: 42%
viscosity: DIN cup at 23° C.: 15 s

| Results | |
|---|---|
| Dry deposit | 5 g/m² on one face |

This paper exhibits the following advantages:
the Scan porosity is greatly reduced by the barrier

| before coating | 220 cm³/s.m² |
| after coating | 0 cm³/s.m² |

This property has the result that the paper can be silicone-treated with solvent-free silicone (Rhodorsil 11367® from Rhône-Poulenc).

Coating Conditions for the Manufacture of PSA Complexes
  silicone treatment on a BMB industrial coating machine, deposition of an acrylic adhesive emulsion of butyl acrylate type at 20 g/m² on a BMB industrial reverse gravure machine, low speed release force values (FTM 3 method), change over time of the release values 1 day and 1 month after coating.

TABLE VIII

|  | Uncoated paper | Coated paper |
|---|---|---|
| Silicone deposition | 2 g/m² | 0.8 g/m² |
| Shirlastain test | does not conform | faultless |
| Release force |  |  |
| (FTM)3 1 day | 1.35 N/25 mm | 0.19 N/25 mm |
| 1 month | tear | 0.21 N/25 mm |

EXAMPLE 4

Glassine Coated on Both Faces

The other face of the paper of Example 2 is coated using a Meyer rod.

| Formulation | % of solids content | Wet part |
|---|---|---|
| Grafted functionalized polyorganosiloxane (Silcolease 700 ® from Rhône-Poulenc) | 40 | 82 |
| Methyl methacrylate/ acrylonitrile/styrene/ 2-ethylhexyl acrylate copolymer (Primal HG 44 E ® from Rohm & Haas) | 41 | 18 | solids content: 40% viscosity: DIN cup at 25° C.: 15 s drying: ventilated oven for 3 minutes at 120° C.

| Results | | |
|---|---|---|
| a) | Dry deposit | 2.5 g/m² on one face |
| b) | Dimensional stability[1] | |
|  | Conventional glassine | machine direction: 82µ |
|  |  | transverse direction: 189µ |
|  | Glassine of the invention | machine direction: 24µ |
|  |  | transverse direction: 46µ |

[1]Measurement of the expansion of a paper with a length of 10 cm dried beforehand and subjected to an atmosphere saturated with water. The measurement of the expansion is carried out after 1 minute.

It may be observed that the glassine of the invention is four times slower than the conventional glassine in reacting to the hygrometric exchanges.

c) Another advantage of the present invention is the insolubility in water of the barrier. Under humid conversion conditions, fluffing, due to the solubilization of the PVA of conventional glassines, will not be observed.

d) Color:

|  | With the presence of the barrier | Without the presence of the barrier |
|---|---|---|
| Trichromatic coordinates DIN 5033/2; Elrepho 2000 D 65, 10° C. | | |
| x | 0.3710 | 0.3691 |
| y | 0.3859 | 0.3840 |
| Y | 73–32 | 73–87 |

It will thus be noticed that the presence of the barrier does not affect the color of the paper.

In view of the above, it should be noted not only that the substitution at a cellulose substrate and in particular at a standard glassine of a conventional coating of the CMC/PVA type by the coating based on a mixture of grafted functionalized polyorganosiloxane and of an acrylic polymeric material of the invention makes it possible to retain all the satisfactory properties of the standard paper and in particular:

the transparency, the polymerization without inhibition of any silicone system (solvent based, solvent-free, emulsion or crosslinkable by UV radiation or an electron beam), the satisfactory attachment of the polymerized silicone to the surface of the paper, release values which are stable over time, the possible use, in addition to glassine paper, of any other paper, such as writing paper or coated paper;

but that this substitution also makes it possible:

to substantially reduce (of the order of 60%) the amount of silicone consumed, to deposit silicone in an aqueous base without the problem of curl, to greatly increase the dimensional stability of the paper from a hygrometric point of view, in particular if the application of the barrier layer is carried out on both faces of the paper, the kinetics of exchange of moisture of the paper with the surroundings being reduced by a factor of 4.

It must be understood that the present invention is not in any way limited to the above embodiments and that many modifications may be introduced therein without departing from the scope of the present patent.

What is claimed is:

1. A process for the treatment of a cellulose substrate to reduce the penetration of adhesive-resistant agent into the substrate and/or to decrease the sensitivity to water of the substrate comprising:

contacting the cellulose substrate with an aqueous emulsion comprising an acrylic polymeric material and further comprising a grafted functionalized polyorganosiloxane comprising polymer chains comprising residues of at least one ethylenically unsaturated monomer (a) capable of being polymerized by the radical polymerization grafted on a functionalized polyorganosiloxane comprising units of the following formula (I):

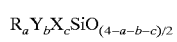

wherein R is C1=C18 alkyl, C2–C20 alkenyl or C6–C12 aryl, optionally substituted with halogen;

X is a reactive function linked to Si by Si—C or Si—C—O bond;

Y is ethylenically unsaturated hydrocarbon group, optionally containing O or N heteroatom, linked to Si by Si—C bond and capable to react radically with the unsaturated monomer (a);

a, b and c are 0 to 3 and a+b+c=3; and the content of $SiO_{4/2}$ is less than 30%.

2. The process as claimed in claim 1, wherein the acrylic polymeric material comprises residues of acrylic monomers selected from the group consisting of acrylic acid, methacrylic acid, acrylamide, methacrylamide, methyl acrylate, methyl methacrylate, ethyl acrylate, ethyl methacrylate, propyl acrylate, propyl methacrylate, butyl acrylate, butyl methacrylate, hexyl acrylate, hexyl methacrylate, cyclohexyl acrylate, cyclohexyl methacrylate, benzyl acrylate, benzyl methacrylate, isopropyl acrylate, isopropyl methacrylate, octyl acrylate, octyl methacrylate, methyl α-chloroacrylate, ethyl α-ethoxyacrylate, 2-ethylhexyl acrylate, 2-ethylhexyl methacrylate, phenyl acrylate, phenyl methacrylate, α-chloroacrylonitrile, N,N-dimethylacrylamide, N,N-dibenzylacrylamide, hydroxyethyl acrylate, hydroxyethyl methacrylate, t-butyl acrylate, t-butyl methacrylate, and mixtures thereof.

3. The process as claimed in claim 1 or 2, wherein the acrylic polymeric material comprises a styrene fraction.

4. The process as claimed in claim 3, wherein the acrylic polymeric material comprising a styrene fraction is an acrylic/styrene copolymer.

5. The process as claimed in claim 4, the styrene fraction comprises residies of styrene monomers selected from the group consisting of styrene, α-methylstyrene, methylstyrene, 2,4-dimethylstyrene, ethylstyrene, isopropylstyrene, butylstyrene, phenylstyrene, cyclohexylstyrene, benzylstyrene, chlorostyrene, 2,5-dichlorostyrene, bromostyrene, cyanostyrene, nitrostyrene, N,N-dimethylaminostyrene, acetoxystyrene, phenoxystyrene and mixtures thereof.

6. The process as claimed in claim 4, wherein the acrylic/styrene copolymer is selected from the group consisting of copolymers of (meth)acrylic acid and styrene, copolymers of butyl (meth)acrylate and styrene, and copolymers of methyl (meth)acrylate, (meth)acrylonitrile, styrene and 2-ethylhexyl-(meth)acrylate.

7. The process as claimed in claim 1, wherein the amount by weight of the acrylic polymeric material in the aqueous emulsion is between 5 and 20%.

8. The process as claimed in claim 7, wherein the amount by weight of the acrylic polymeric material is from 15 to 20%.

9. The process as claimed in claim 1, wherein the amount by weight of the grafted functionalized polyorganosiloxane in the aqueous emulsion is between 10 and 20%.

10. The process as claimed in claim 9, wherein the amount by weight of the grafted functionalized polyorganosiloxane is about 15%.

11. The process as claimed in claim 1, wherein the the weight ratio of the ethylenically unsaturated monomer to the functionalized polyorganosiloxane in the grafted functionalized polyorganosiloxane is from 98–50 to 2–50.

12. The process as claimed in claim 1, wherein said aqueous emulsion further comprises one or more additives selected from the group consisting of thickeners, antifoaming agents and waxes.

13. The process as claimed in claim 12, comprising a thickener and an antifoaming agent wherein said thickener is aqueous dispersion of poly(ammonium acrylate) and said antifoaming agent is a modified polyalkoxylated alkyl ether in a paraffinic medium.

14. The process as claimed in claim 12, wherein the total amount by weight of the additives in the emulsion is from 0.3 to 1.5%.

15. The process as claimed in claim 1, the grafted functionalized polyorganosiloxane in the emulsion has a mean particle size from 0.3 to 1.0 µm.

16. The process as claimed in claim 1, the acrylic polymeric material in the emulsion has a mean particle size of 0.05 to 0.3 µm.

17. The process as claimed in claim 16, the mean particle sizes of the polyorganosiloxane and the acrylic polymeric material in the aqueous emulsions are about 0.6 and about 0.15 µm respectively.

18. The process as claimed in claim 1, wherein the cellulose substrate is a glassine paper, a writing paper or a coated paper.

19. The process as claimed in claim 1, wherein units (I) containing X and/or Y are present in the amount such that the functionalized polyorganosiloxane comprises at least 1 milliequivalent of X and at least 1 milliequivalent of Y per 100 grams of the functionalized polyorganosiloxane.

20. The process as claimed in claim 1, wherein said X is a C1–C20 hydrocarbon epoxy-functional group.

21. The process as claimed in claim 11, wherein said ratio is from 95–75 to 5–25.

22. A self-adhering article of manufacture comprising a pressure sensitive adhesive material protected with a cellulose substrate treated by the process as claimed in claim 1.

23. The self-adhering article of manufacture as claimed in claim 22, wherein said cellulose substrate is glassine paper.

* * * * *